United States Patent [19]
Vik

[11] 4,348,989
[45] Sep. 14, 1982

[54] ADJUSTABLE WATERER

[76] Inventor: Darrell D. Vik, 203 N. 8th St., Beresford, S. Dak. 57004

[21] Appl. No.: 124,453

[22] Filed: Feb. 25, 1980

[51] Int. Cl.³ .............................................. A01K 7/06
[52] U.S. Cl. ..................................... 119/72; 248/125; 248/219.1
[58] Field of Search .................... 119/72, 72.5, 75, 61; 248/59, 125, 207, 219.1, 221.2, 327, 423

[56] References Cited

U.S. PATENT DOCUMENTS

| | | | |
|---|---|---|---|
| 1,614,550 | 1/1927 | Hass | 119/61 |
| 3,495,796 | 2/1970 | Fruh | 248/327 |
| 4,173,948 | 11/1979 | Austin | 119/72 |
| 4,205,629 | 6/1980 | Wix | 119/61 X |

FOREIGN PATENT DOCUMENTS 326436 6/1958 Switzerland .................. 119/72.5

*Primary Examiner*—Gene Mancene
*Assistant Examiner*—Robert P. Swiatek
*Attorney, Agent, or Firm*—Lucas J. DeKoster

[57] ABSTRACT

An adjustable animal waterer including a wall-mounted stanchion on which is slidably mounted a watering device to be connected on one end to the water source and to be provided on the other with a slight bend and a nipple from which the water is dispensed. The position of the pipe may be fixed by means of a U-shaped, spring-loaded pin which engages any one of several holes provided in the wall stanchion. The pin may be removed and replaced with minimal effort without requiring the use of tools.

2 Claims, 4 Drawing Figures

ADJUSTABLE WATERER

BACKGROUND AND SUMMARY OF THE INVENTION

Young domesticated animals must be provided with an adequate supply of water. As a matter of convenience and for reasons of sanitation, it is better that this water by provided by means of a system which is continuously fed, thus providing water on a demand basis, and which is maintained relatively clean by being elevated from the floor of the animal's quarters. The device dispensing the water must also be located at an elevation at which the animal can readily reach the water—an elevation which may change as the animals grow. In order to make the desired adjustment in elevation, the means should be easily operable and, in the event of breakdown, be easily repaired or replaced.

The devices with which I am familiar have only clumsy means for height adjustment, usually requiring the dismounting and remounting of the entire unit if such adjustment is desired. Such dismounting and remounting usually require the use of enough tools that a tool box is necessary. By my invention I have provided a means by which such adjustment may be made while leaving the mounting stanchion in place, and without the use of tools. Additionally, the means by which the height is fixed after adjustment is easily operable and reparable without the use of tools. Yet, when engaged, would allow no slippage or accidental movement of the watering device.

FIGURES

DESCRIPTION

Figure 1:
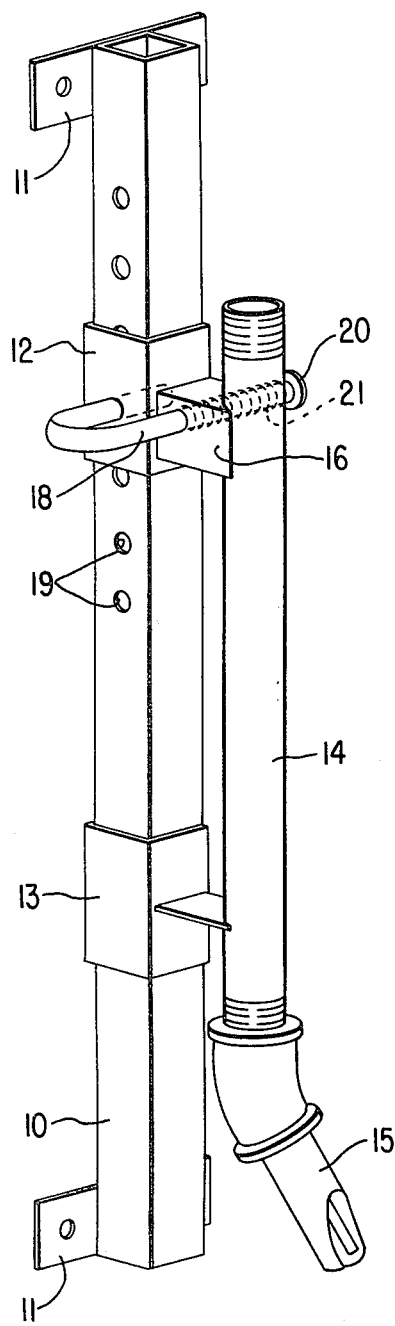
FIG. 1 is a pictorial view of the device.

Briefly, my invention is a watering device for domesticated animals which consists of a wall-mounted stanchion on which is slidably mounted a watering pipe to be connected at the upper end to the water source and terminating at the lower end in a watering nipple. In the stanchion I provide a series of holes into which a spring-loaded pin may fit allowing vertical adjustment of the watering pipe.

More specifically, and referring to the drawings, I provide a vertical stanchion 10 mountable on a wall or other vertical surface by means of straps 11 affixed to either end of the stanchion and of sufficient thickness to allow clearance from the vertical mounting surface for the upper bracket 12 and the lower bracket 13. This is but one means by which such mounting could be done. Any method which provides sufficient clearance for the brackets is acceptable. Each of the brackets 12 and 13 consists of a square tube slidable along stanchion 10. A pipe 14, which provides a conveyance for the water from the source to the nipple 15, is attached to upper bracket 12 by means of an angle iron flange 16, consisting of a horizontal and a vertical member, and to lower bracket 13 by means of a horizontal flange. I show the upper end of pipe 14 as threaded, one means of coupling my device to a water source. But any means which provides for a watertight connection is suitable. The lower end of pipe 14 is equipped with an angled joint by which the nipple 15 is made more accessible to the animal.

The vertical member of flange 16 is provided with a hole through which is fitted a U-shaped pin 18 with legs of unequal length. The longer of the legs terminates in a head 20 while the shorter leg is tapered at its end to aid its insertion into the height adjusting holes 19. By fitting the pin into these holes, provided at regular intervals along the stanchion, the height of brackets 12 and 13, and, therefore, of nipple 15, is fixed on stanchion 10.

A coil spring 21 surrounds pin 18 between a head 20 and the vertical member of flange 16. The compressive force of the spring 21 keeps the pin 18 in the desired hole 19 in the stanchion 10. By pressing the head 20 of pin 18, thus compressing the spring 21, the shorter leg of the pin may be disengaged from the hole 19 in the stanchion, allowing brackets 12 and 13 and pipe 14 to be vertically adjusted along the stanchion. When the desired height is found, the pin 18 may be released and its shorter leg fitted into the hole 19 which fixes the pipe 14 and nipple 15 at the desired height. This operation requires no tools and does not require the removal of the pin 18 from the device. Thus, the risk of loss of the pin and the inconvenience of needing to have tools available are minimized.

Figure 2:
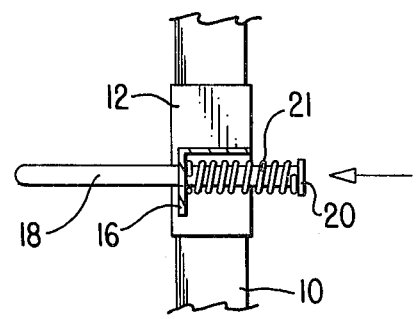
FIG. 2 is a detailed front elevational view of the adjustment holding pin in its engaged position.
Figure 3:
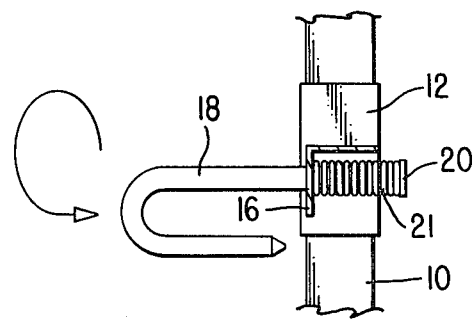
FIG. 3 is a view similar to FIG. 2 with the pin disengaged and rotated 90°.
Figure 4:
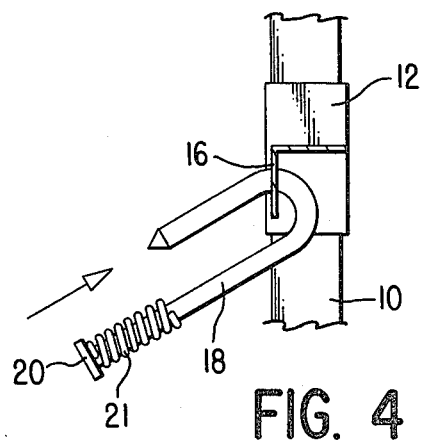
FIG. 4 is a view similar to FIG. 3 showing the method of removing the pin.

The pin 18 may also be easily removed and replaced as illustrated in FIGS. 2, 3 and 4. This operation requires that the distance between the legs of pin 18 be at least equal to the distance from the hole in the vertical member of flange 16 to bottom of that member. To replace pin 18, it is first disengaged from stanchion 10 by pressing the head 20 of the pin against the force of the spring 21 in the direction indicated by the arrow in FIG. 2. While maintaining said pressure on the pin, it is rotated about a horizontal axis as designated by the arrow in FIG. 3 to the position illustrated in that figure. Pressure may then be released and the pin 18 removed from the hole in flange 16 by rotating the pin and sliding it from the hole as illustrated in FIG. 4. The pin may be repositioned or replaced by a new pin simply by reversing the process described above. This method of replacement is highly advantageous because it can be accomplished with one hand, without the aid of tools and without dismounting of the bracket and also is relatively rapid.

I claim as my invention:

1. An animal watering device comprising:
   a. a wall-mounted stanchion formed with a plurality of holes,
   b. brackets slidably mounted on said stanchion, at least one of said brackets formed to provide a hole,
   c. holding means engageable between said one bracket and said stanchion including a "U" shaped pin slidable through said hole in said bracket and into any one of said holes in said stanchion,
   d. spring means engaged between said pin and said bracket to bias said pin to the position in which it extends into the hole in the stanchion,
   e. water transmitting pipe means vertically mounted on said brackets, and
   f. a nipple on said pipe means whereby said nipple may be adjusted vertically relative to said stanchion.

2. The device in claim 1 in which the distance between the hole in the slidable bracket and the lower edge of said bracket is less than the distance between the two legs of the "U" shaped pin allowing said pin to be easily removed and replaced through several simple manipulations not requiring the use of tools.

* * * * *